3,398,040
VACUUM COATED PRODUCT
Lloyd R. Allen, Belmont, and Robert W. Steeves, Nahant, Mass., assignors to National Research Corporation, Cambridge, Mass., a corporation of Massachusetts
Filed Apr. 1, 1965, Ser. No. 444,529
20 Claims. (Cl. 161—45)

ABSTRACT OF THE DISCLOSURE

A heat rejecting window including a clear plastic film, a layer of window glazing, a semitransparent layer of metal vacuum deposited on the inner surface of said film, and a thin layer of transparent organic liquid securing said plastic film to said glazing by surface tension.

---

The present invention relates to improvements in laminated glass structures and particularly to laminated glass structures used as single pane glazing for doors and windows in buildings.

It is a principal object of the invention to provide useful laminated glass structures which are reflective in the ultraviolet and infrared wavelength regions and transparent to the visible light wavelength region (at least 50% transmittance in the blue visible region).

It is a related object of the invention to provide laminated glass structures consisting of metallized plastic bonded on glass with a nonpermanent adhesive which permits stripping the metallized plastic from the glass after long periods of use.

Semitransparent radiation barriers for providing temperature control are well known. However, they have not found wide application in glazing applications. These prior art approaches to utilize the metal barrier have included special glass compositions, metal oxide coating directly on glass, metallized window shades, and metal-plastic laminates bonded to glass by various adhesives. The difficulties with the prior art products have been great expense, difficulty of application, degradation of the adhesive after prolonged exposure to sunlight and high susceptibility to humidity. Each of the above prior art products has been subject to one or more of these problems.

It is a further object of the invention to provide maximum efficiency in using the laminated glass structures by arranging the metal layer of the metallized plastic between the plastic and the principal source of incident light, and with the metal coating protected from scratching.

These and other objects of the invention are accomplished, in a preferred embodiment, by the structural combination of a vacuum aluminized polyethylene terephthalate film sheet bonded to a window by means of an adhesive such as an alkylene glycol and surrounded by a moisture barrier in the form of a solid resin border at the edge of the sheet to completely enclose the liquid adhesive. However, the invention is generally applicable to several plastic films which can be coated with a variety of metals and which can be laminated to glass using many stable non-volatile organic liquids.

The bonding of the metallized plastic film to the window is accomplished by first spraying on the window a solution or suspension of the adhesive in a volatile carrier liquid— e.g., adhesive liquid dissolved in trichloroethylene or as an emulsion in water. The metallized plastic film is then spread and flattened against the window. Upon standing, the carrier evaporates and diffuses through the metallized plastic film and this tends to pull the metallized plastic film against the glass by reducing the volume of the adhesive layer. The laminate also demonstrates a self-ironing effect wherein wrinkles in the plastic sheet are smoothed out as it is drawn against the glass. After allowing the laminate to stand for several hours, the edges of the metallized plastic may be sealed by applying a permanent adhesive such as piccolastic petroleum resin dissolved in trichloroethylene. Upon standing, the solvent evaporates and the resin solution dries, even in the presence of the adhesive, to form a solid border seal. The adhesive is trapped in the laminate and enclosed by the solid edge seal so that it remains liquid, even when the completed laminate is exposed to adverse weather conditions for several months.

Advantageously, the metallized plastic film is arranged with the metal coated side towards the sun. This arrangement substantially reduces the ultraviolet and infrared light which upon reaching the plastic would degrade it. Window glass is provided with the metallized plastic on the indoor side and the metal side of the plastic towards the window. The uncoated plastic side facing into the room is sufficiently rugged to be washed many times without tearing or scratching. The temporary adhesive bonding of the laminate is strong enough to prevent wrinkling of the metallized plastic during the application or during washing. It is preferred to include an inhibitor agent in the adhesive fluid to prevent the adhesive from reacting with the metal coating. For example, ethylene diamine could be used as the inhibitor agent.

Other objects, features and advantages will in part appear hereinafter and will in part be obvious from the discussion herein.

The invention accordingly comprises, as an article of manufacture, a structural glass laminate comprising a metallized plastic bonded to a glass pane to reduce radiant heat transmission of the laminate with a selective higher transmittance in the visible light radiation band, the laminate being formed of a novel structural combination which yields the surprising advantages of ease of construction of the laminate and ease of removability of the metallized plastic from the glass after extended use. In a particular aspect, the invention comprises an improved window for limiting radiant heat input to a building by reflecting light in the ultraviolet and infrared regions while affording adequate transmission of light throughout the visible range or through a selective portion of the visible range.

The preferred embodiment of the invention is now more particularly described with reference to the drawings wherein.

Figure 1:
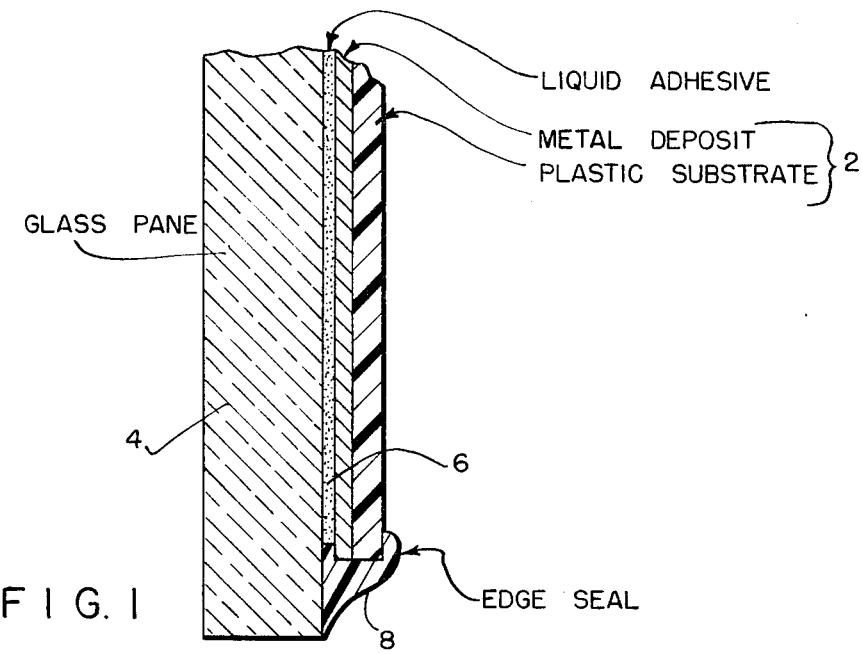
FIG. 1 is a schematic drawing of the structural laminate of the invention viewed in section along a portion thereof.
Figure 1A:
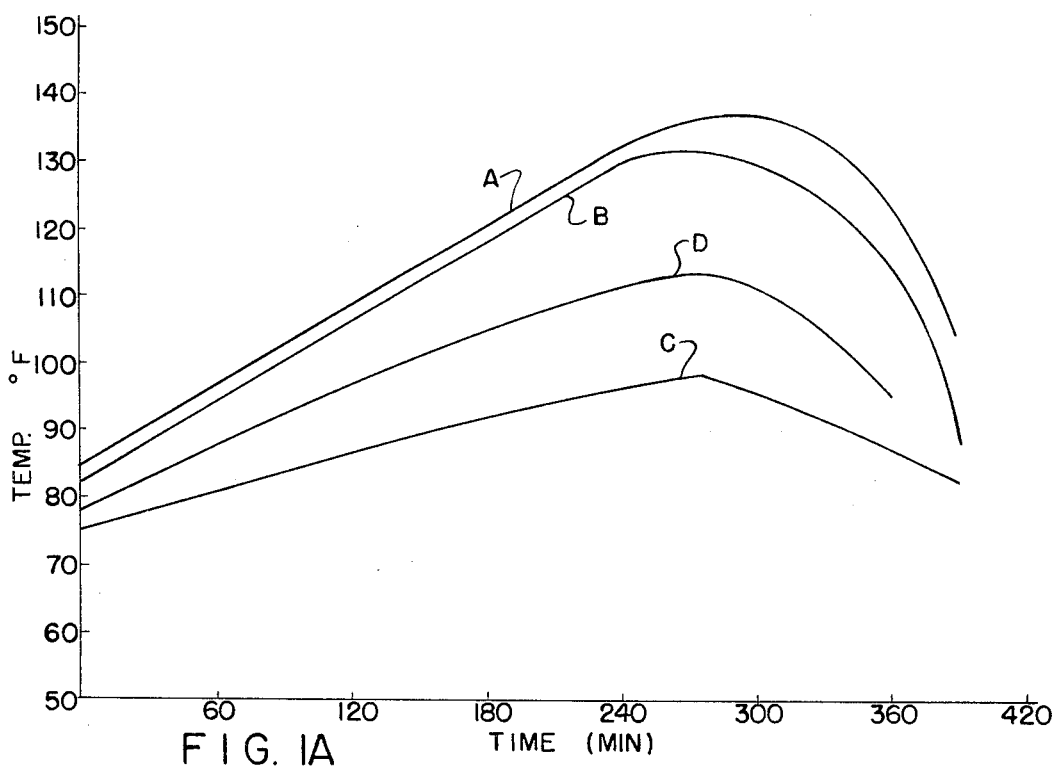

Referring now to FIG. 1, the laminate is shown with the metallized plastic coating 2 secured to the glass pane 4 by an adhesive layer 6. The adhesive is in liquid form to provide a non-permanent bond which allows the coating 2 to be stripped. At the edge of the coating 2 there is provided a solid edge seal 8.

According to the preferred embodiment of the invention, the field of application is glazing already in place in the windows or doors of a building, vehicle, etc. The plastic fielm comprises a thin oriented film produced as a polyester condensation product of ethylene glycol and terephthalic acid, e.g., produced by E. I. du Pont de Nemours & Company as "Mylar." This film is coated with aluminum by conventional vacuum deposition process, as shown, for instance, in U.S. Patent 2,665,223 to Clough et al., or U.S. Patent 2,971,862 to Baer et al. The polyester film sheet is selected in a thickness between one and two mils. The aluminum is deposited in a thickness between 40 A. and 150 A. The coating is sufficiently adherent that it resists removal by pressure sensitive tape. The window is prepared for lamination by covering with adhesive liquid. The adhesive liquid contains a saturated high boiling hydrocarbon or hydrocarbon derivative having a Saybolt viscosity between 250 and 500 seconds at 100° F.; plus a rust inhibitor which is preferably an aromatic amine; and a low viscosity oil, as necessary, to counterbalance the relatively high viscosity of the glycol. The saturated hydrocarbon is present in amounts of 30–40% by weight and 2–10% by weight of inhibitor is included in the mixture, the balance being a low viscosity oil. This adhesive mixture is prepared in equal parts with trichloroethylene solvent or in a ratio of 1 part adhesive mixture to 2 parts water as an emulsion. Emulsification is readily attained by agitation in a blender.

A preferred adhesive liquid mixture comprises as a major ingredient (80%) a water insoluble polyalkylene glycol copolymer, as described in U.S. Patent 2,448,664, and marketed as UCON LB–300X. This material has a viscosity of 285 Saybolt Universal seconds at 100° F., a pour point of $-40$ to $-30°$ C., a density of about .99 gm./cc. and a vapor pressure less than .01 millimeter mercury at 68° F. The rust inhibitor is present as 5% of the mixture and is triethanolamine nitrite, but may also be phenoethanolamine. The remainder of the mixture (10%) is odorless kerosene (Bayol). The mixture is emulsified in water. The amine rust inhibitors tend to promote emulsification.

Adhesive liquids have also been prepared using only kerosene and a carrier liquid. The metallized plastic is assembled with the glass as described below and, preferably, an edge seal is applied as described below. The assembled window has the paraticular advantages that:

(a) The saturated hydrocarbon adhesive is not subject to penetration of moisture and does not form pockets of water between the glass and metallized plastic;

(b) The adhesive has high oxidation resistance;

(c) The plastic sheet is easily removed (after cutting away the edge seal, the sheet can be stripped away as a whole);

(d) Application of the sheet is assisted by the self-ironing effects of this combination; and (e) The window exhibits excellent optical and thermal insulating properties.

Figure 2:
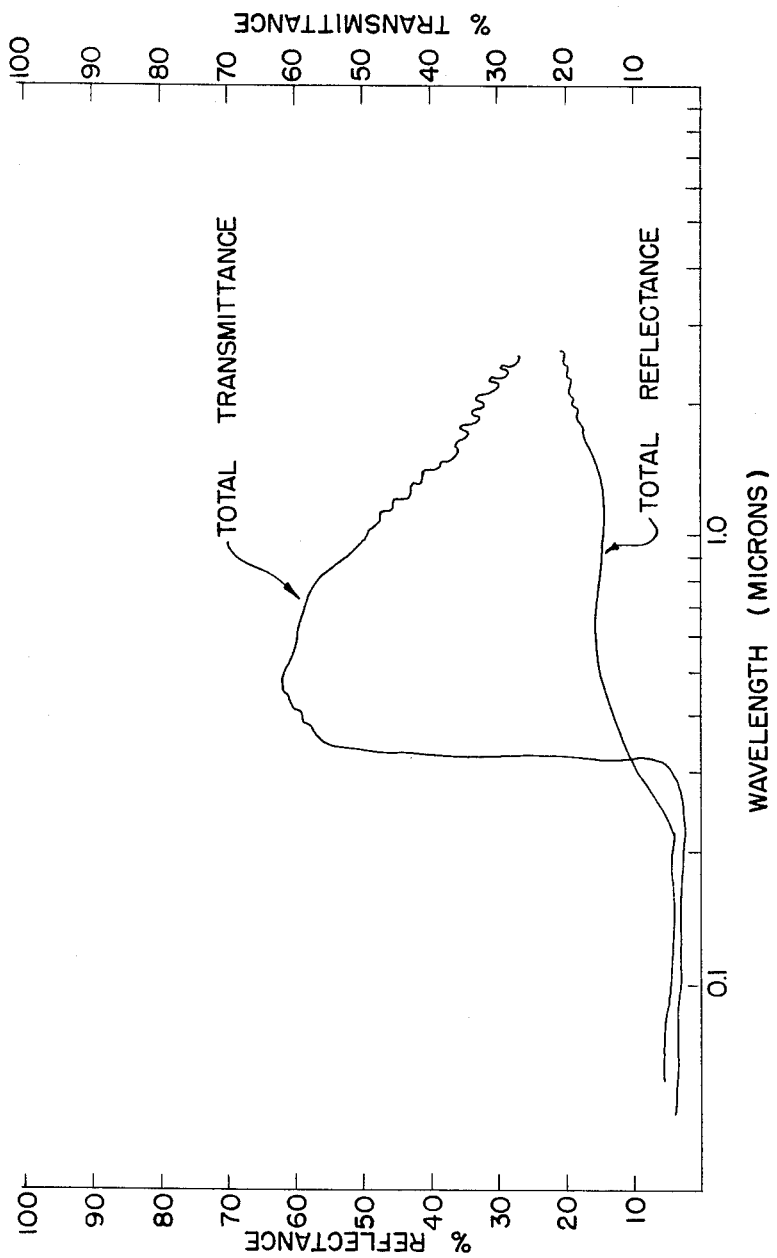
FIG. 2 is a graph showing the transmission and reflectance of light through a laminate as prepared according to the preferred embodiment of the invention.

FIG. 2 shows the optical transmittance and reflectance of the laminate over the range of .005 micron to 2.5 microns wavelength, as determined by spectrophotometer analysis. The data was taken with the bare glass surface facing towards the source of incident light and metallized side of the film facing towards the light sources (i.e., the metal layer between the glass and plastic layers). The visible light region is between .38 and .78 micron. As shown on the curves, the total transmittance peaks in the visible light region and is substantially lower in the ultra-violet and infrared regions. This laminate has an optimum combination of absorption and reflecting properties. The substantially uniform level of the transmittance and reflectance curves in the visible light region minimize optical distortion. As for insulating properties, temperature rises on absorbing plates exposed to sunlight through windows have been lowered by as much as 30° F. through the use of the present window laminate.

EXAMPLE

Several windows in a single room were provided with thermocouples for measuring the windowsill temperatures of the various windows (A, B, C, D).

Window A had a bare pane.

Window B was covered on the interior with clear polyethylene terephthalate sheet (1 mil thick).

Window C was covered on the interior with a 1 mil polyethylene terephthalate sheet vacuum metallized with an 80% reflective (to blue light wavelength) aluminum coating.

Window D was covered on the interior with a 1 mil polyethylene terephthalate sheet vacuum metallized with a 25% reflective aluminum coating.

For windows B, C and D, the adhesive liquid was a solution of kerosene dissolved in trichloroethylene carrier with the kerosene and trichloroethylene mixed in equal parts by volume.

Temperature readings were taken for the four windows on a sunny day from 8:27 a.m. to 2:55 p.m. During the test period the room temperature varied from 73° F. to 90° F. and then to 85° F. The readings for the windowsills A, B, C, D varied as shown in the curves of FIG. 2A. The sun was initially bright and later hazy. This accounts for the drop at the end of all four curves.

If desired, ultra-violet absorbing salts can be included in the adhesive. In practice, 1% by weight of salts have been dissolved in the adhesive before diluting with carrier. A preferred salt is Cyasorb UV–24 which absorbs in the range .3–.4 micron and remits at about 1.1 microns wavelength.

*Method of application*

Figure 3:
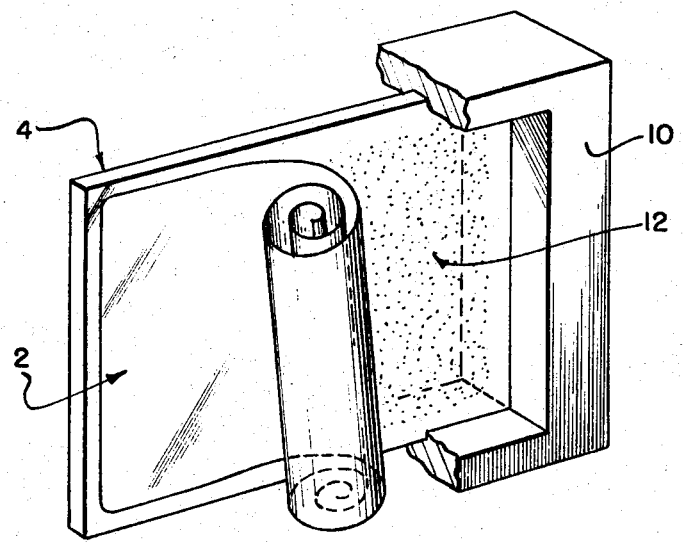
FIG. 3 shows a window in isometric, partly cut-away fashion as an early stage of processing according to the invention.
Figure 4:
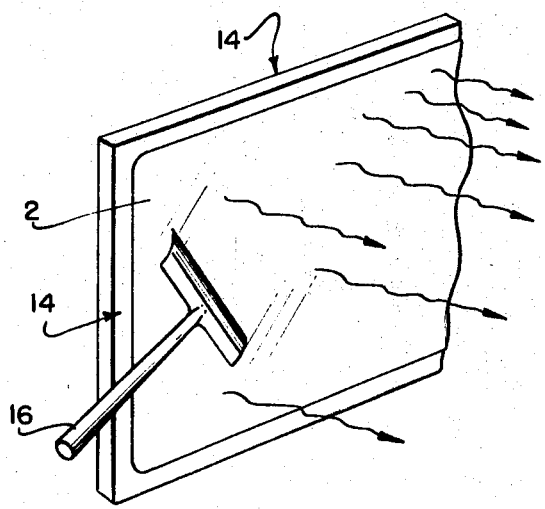
FIG. 4 shows a portion of the window after initial application of the metallized plastic and before edge sealing.

The metallized plastic is applied to a window 10 as shown in FIGS. 3–6. Referring to FIG. 3, an adhesive in a diluent carrier is applied to the glass pane 4 as a liquid film 12 using an aerosol spray gun. Then a vacuum metallized plastic sheet 2 is manually set against the pane with the metallized surface towards the glass. The worker flattens out the sheet (FIG. 4) with a rubber-edged squeegee 16 to remove wrinkles and push excess liquid out through the edges 14 of the film 2. The laminate is allowed to stand for a day, during which time the carrier volatilizes and escapes through the metallized film.

Figure 5:
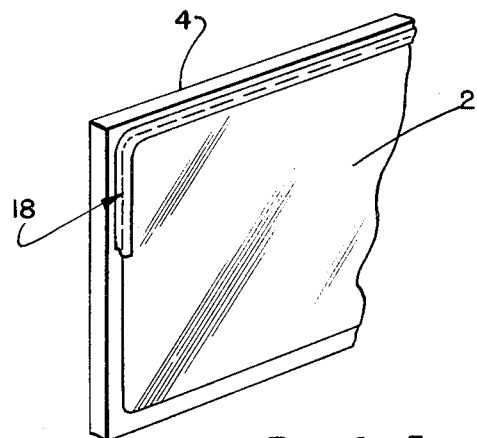
FIG. 5 shows a portion of the window during the edge sealing step.
Figure 6:
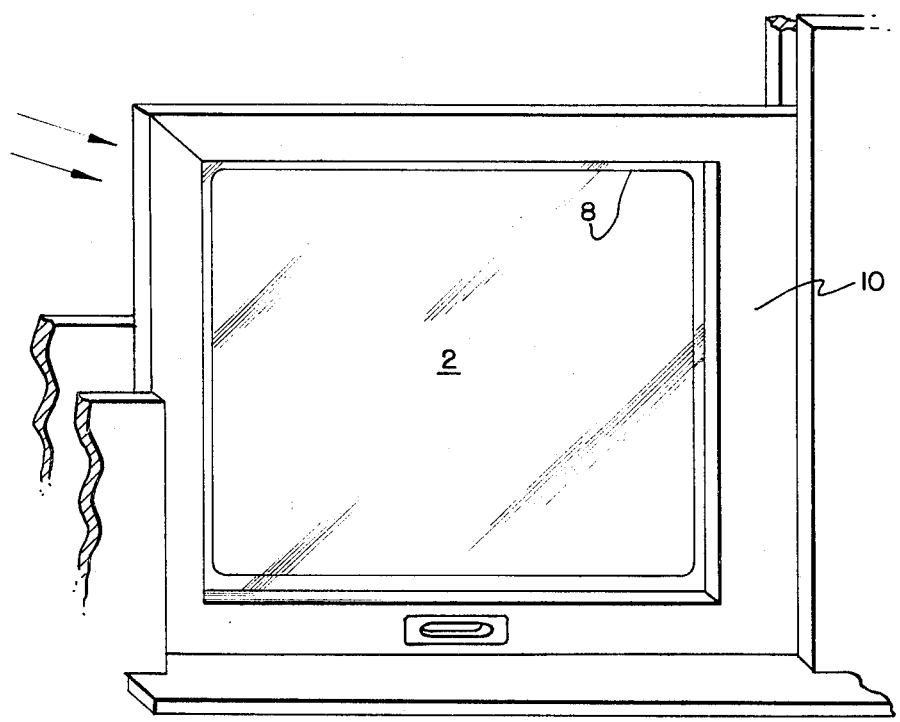
FIG. 6 shows the coated and sealed window after processing.

Referring to FIG. 5, an edge seal 18 in liquid form (e.g., piccolastic resin, polymethylmethacrylate or polystyrene dissolved in trichloroethylene) is spread along the edge of the metallized film 2 through the use of an absorbent applicator such as a felt pencil soaked with the edge seal liquid. Upon further standing, the solvent evaporates and the edge seal dries to a transparent solid. The resultant window 10 is shown in FIG. 6. The thickness of the adhesive organic liquid is less than .001 inch. The distortion of light due to the metallized film adhesive and edge seal are minor; the presence of a covering on the window is often unnoticed. Unlike prior art laminates, which are hygroscopic, the edge seal and adhesive composition of the present invention limit the absorption of moisture by the laminate from the atmosphere or from washing.

The invention, while described above with reference to preferred ingredients and steps of application, may be practiced in a variety of other forms. For instance, the plastic sheet could be polyvinyl chloride or polyethylene. The semitransparent vacuum deposited metal coating could be copper, gold, tin or silver or selected from many metals other than aluminum. The adhesive may be any nonvolatile, transparent, nondrying liquid which can be applied to glass and hold the plastic sheet by surface tension. As a broad measure of the volatility, the adhesive should be selected from liquids which have a characteristic evaporation rate of less than about 5% as determined by the standard ASTM D92–51T test. Where the adhesive has a high viscosity, it should be mixed with a low viscosity oil to give the composite a low viscosity. By low viscosity, we mean that a liquid is easily spread by a worker using a roller or squeegee or the like.

Those skilled in the art will recognize that a wide variety of rust inhibitors are available which would remain colorless and could be used in the above application. The diluent carrier should have a volatility at least equal to or as great as that of benzene and preferably equal to or greater than that of water. For instance, halogenated hydrocarbon solvents, particularly trichloroethylene, are good substitutes for water as the carrier for volatilizing through the metallized plastic in a reasonable time. Their concentration in the adhesive layer decreases very rapidly.

Instead of a liquid edge seal which is dried after application, one could use a pressure sensitive tape or chemically activated tape as the edge seal.

Since the inventive concept of our invention, once disclosed, can be utilized in a wide variety of equivalent forms, it is intended that the above disclosure, including the drawings, shall be read as illustrative and not in a limiting sense.

What is claimed is:

1. A heat rejecting window comprising, in combination, a layer of clear plastic film, a layer of window glazing, a thin, semitransparent layer of metal vacuum deposited on said plastic film on the surface thereof facing said glazing, and a thin layer of transparent organic liquid securing the plastic to the glazing by surface tension.

2. The window of claim 1 wherein the metal layer is less than 150 Angstroms thick.

3. The window of claim 1 wherein the metal layer transmits at least 40% of incident light radiation through at least a portion of the visible light band and reflects more light in the infrared region than in the visible light region.

4. The window of claim 1 wherein the window transmits less than 50% of infrared radiation in the region between 1 and 150 microns wavelength, and transmits more than 50% incident radiation in at least a portion of the visible light band.

5. The window of claim 1 wherein the thickness of the organic liquid is less than .001 inch.

6. The window of claim 1 wherein a solid edge seal is provided around the edge of the plastic to complete the enclosure of the liquid.

7. A heat rejecting laminate for windows and the like comprising a layer of clear plastic sheet, a layer of glass, a thin semitransparent layer of vacuum-deposited metal on the plastic film, an organic liquid adhering the metallized plastic to the glass, the liquid being stable when subject to ultraviolet and infrared radiation.

8. The laminate of claim 7 wherein the liquid is a mixture of a saturated hydrocarbon plus an inhibitor to prevent reaction of the hydrocarbon with metal and wherein a side of the plastic coated with metal is adhered to the glass by the liquid.

9. The laminate of claim 7 wherein the liquid is a mixture of high viscosity and low viscosity hydrocarbons plus inhibitor.

10. The laminate of claim 8 wherein the high viscosity hydrocarbon is an alkylene glycol.

11. The laminate of claim 10 wherein the inhibitor is an aromatic amine compound.

12. The laminate of claim 7 wherein the liquid also contains a volatile diluent whose concentration in the liquid decreases with time.

13. The laminate of claim 12 wherein the volatile diluent is trichloroethylene.

14. The laminate of claim 12 wherein the volatile diluent is water.

15. The laminate of claim 12 wherein the diluent is a substance which is at least as volatile as benzene and is capable of dispersing a liquid component.

16. The laminate of claim 7 further comprising a solid edge barrier forming, with the metallized plastic and glass, an enclosure for the liquid.

17. The laminate of claim 16 wherein the moisture barrier is a resin polymerized in situ along the edge of the plastic sheet.

18. The laminate of claim 17 wherein the resin is a styrenated polymer.

19. The laminate of claim 16 wherein the moisture barrier is a tape laid over the edge of the plastic sheet.

20. The laminate of claim 7 wherein the liquid inner layer between the glass and metallized sheet has as a principal component a liquid substance which has a characteristic evaporation rate of less than 5% as determined by the ASTM D972–51T test.

References Cited

UNITED STATES PATENTS

| | | | |
|---|---|---|---|
| 3,069,301 | 12/1962 | Buckley et al. | 156—99 XR |
| 3,180,781 | 4/1965 | Ryan et al. | 161—45 |
| 3,290,203 | 12/1966 | Antonson et al. | 161—4 |

ROBERT F. BURNETT, *Primary Examiner.*

W. A. POWELL, *Assistant Examiner.*